United States Patent
Iwahashi et al.

(10) Patent No.: US 11,282,542 B2
(45) Date of Patent: Mar. 22, 2022

(54) TAPE CARTRIDGE WITH REEL LOCK RELEASE MEMBER HAVING GRADUALLY DECREASING THICKNESS EXTENSION PORTIONS

(71) Applicant: Sony Corporation, Tokyo (JP)

(72) Inventors: Yuji Iwahashi, Miyagi (JP); Hiroshi Kumagai, Miyagi (JP); Chisato Akasaka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/970,847

(22) PCT Filed: Dec. 3, 2019

(86) PCT No.: PCT/JP2019/047111
§ 371 (c)(1),
(2) Date: Aug. 18, 2020

(87) PCT Pub. No.: WO2020/129599
PCT Pub. Date: Jun. 25, 2020

(65) Prior Publication Data
US 2021/0312947 A1  Oct. 7, 2021

(30) Foreign Application Priority Data
Dec. 19, 2018 (JP) ............................ JP2018-237030

(51) Int. Cl.
*G11B 23/107* (2006.01)
*G11B 23/04* (2006.01)
(Continued)

(52) U.S. Cl.
CPC .......... *G11B 23/043* (2013.01); *G11B 23/027* (2013.01); *G11B 23/107* (2013.01); *G11B 5/78* (2013.01)

(58) Field of Classification Search
None
See application file for complete search history.

(56) References Cited

U.S. PATENT DOCUMENTS 6,411,466 B1 * 6/2002 Shima et al. ........ G11B 23/043
360/132
6,452,748 B1 * 9/2002 Shima et al. ........ G11B 23/043
360/132
(Continued)

FOREIGN PATENT DOCUMENTS

JP  2001-052464 A  2/2001
JP  2003-100051 A  4/2003
(Continued)

OTHER PUBLICATIONS

International Search Report issued in connection with PCT/JP2019/047111, dated Mar. 3, 2020.

*Primary Examiner* — Craig A. Renner
(74) *Attorney, Agent, or Firm* — K&L Gates LLP

(57) ABSTRACT

A tape cartridge includes a reel; a cartridge case; a reel lock member; and a reel lock release member. The reel includes a reel hub including a cylindrical bottom portion. The reel lock member includes a projecting portion projecting to engage with the reel hub. The reel lock release member includes a main body and leg portions, the main body disposed between the reel lock member and cylindrical bottom portion, the leg portions extending from the main body and being inserted into through holes, the reel lock release member releasing engagement of the reel lock member and reel hub. The main body includes central portion and extension portions, the central portion in contact with the projecting portion, the extension portions extending radially to end portions connected to the leg portions, thicknesses of (Continued)

the extension portions along a uniaxial direction gradually decreasing from the central portion toward the end portions.

10 Claims, 13 Drawing Sheets

(51) Int. Cl.
*G11B 23/027* (2006.01)
*G11B 5/78* (2006.01)

(56) References Cited

U.S. PATENT DOCUMENTS

2002/0085312 A1* 7/2002 Morita et al. ........ G11B 23/043
　　　　　　　　　　　　　　　　　　　　　　360/132
2009/0078810 A1　3/2009 Fukuda et al.

FOREIGN PATENT DOCUMENTS

| JP | 2009-076160 | | 4/2009 |
| JP | 2013-054791 | A | 3/2013 |
| JP | 2014-071911 | A | 4/2014 |

* cited by examiner

TAPE CARTRIDGE WITH REEL LOCK RELEASE MEMBER HAVING GRADUALLY DECREASING THICKNESS EXTENSION PORTIONS

TECHNICAL FIELD

The present technology relates to, for example, a tape cartridge that rotatably houses a reel on which a magnetic tape is wound.

BACKGROUND ART

In the past, as a magnetic tape cartridge used as an external recording medium of a computer or the like, those rotatably housing a single tape reel on which a magnetic tape is wound in a cartridge case have been known. This type of magnetic tape cartridge is used for storing data of a computer or the like and a huge amount of important information has been recorded thereon. Therefore, such a magnetic tape cartridge needs to have a structure that does not become unusable due to an impact of a drop or the like.

The above-mentioned single reel type magnetic tape cartridge has a reel lock mechanism that prevents the tape reel from rotating in order to prevent the magnetic tape from loosening due to rotation of the tape reel inside the cartridge case when the cartridge is not used.

For example, Patent Literature 1 describes an LTO (linear tape open cartridge) type magnetic tape cartridge having a reel lock mechanism. The magnetic tape cartridge includes a reel lock member that engages with a reel to block rotation thereof, a biasing member that urges the reel lock member to engage with the reel, and a reel lock release member that presses the reel lock member to move against the urging force of the biasing member to release the engagement with the reel. The reel lock release member has a substantially triangular shape, and a total of three legs are formed on the lower surface of the reel lock release member to project downward from the vicinity of each apex portion of the substantially triangular shape.

CITATION LIST

Patent Literature

Patent Literature 1: Japanese Patent Application Laid-open No. 2009-76160

DISCLOSURE OF INVENTION

Technical Problem

The reel lock release member is desired to have a configuration that can be produced at lower cost and can maintain the strength enough to withstand use.

In view of the circumstances as described above, it is an object of the present technology to provide a tape cartridge including a lock release member that can be produced at low cost and can ensure sufficient strength.

Solution to Problem

In order to achieve the above-mentioned object, a tape cartridge according to an embodiment of the present technology includes: a reel; a cartridge case; a reel lock member; and a reel lock release member.

The reel includes a reel hub including a cylindrical surface and a cylindrical bottom portion, the cylindrical surface having an axis in a uniaxial direction, a tape being wound on the cylindrical surface, a plurality of through holes penetrating in the uniaxial direction being formed in the cylindrical bottom portion.

The reel lock member includes a projecting portion projecting toward the cylindrical bottom portion in the uniaxial direction and is urged in the uniaxial direction to engage with the reel hub.

The reel lock release member includes a main body and a plurality of leg portions, the main body being disposed between the reel lock member and the cylindrical bottom portion, the plurality of leg portions extending from the main body in the uniaxial direction and being inserted into the plurality of through holes, the reel lock release member releasing engagement of the reel lock member and the reel hub on a basis of movement in the uniaxial direction against an urging force of the reel lock member.

The main body includes a central portion and a plurality of extension portions, the central portion being in contact with the projecting portion, the plurality of extension portions extending radially along a direction perpendicular to the uniaxial direction from the central portion to end portions connected to the plurality of leg portions, thicknesses of the plurality of extension portions along the uniaxial direction gradually decreasing from the central portion toward the end portions.

In the reel lock release member having the above-mentioned configuration, the extension portions that connect between the central portion and the leg portions extend radially, the central portion being in contact with the reel lock member, the leg portions being capable of coming into contact with a tape drive device via the through holes. As a result, it is possible to reduce the weight of the reel lock release member and reduce the production cost. Further, since the thicknesses of the extension portions gradually decrease from the central portion toward the end portions, it is possible to ensure the thickness of the central portion to be in contact with the reel lock member. As a result, it is possible to ensure the strength of the central portion to be pressed from the side of the reel lock member and prevent a defect such as an abnormal sound due to deformation of the central portion from occurring.

Each of the plurality of extension portions may have a first main surface that faces the reel lock member, and a second main surface disposed on an opposite side of the first main surface, and the second main surface may include groove portions extending in respective extending directions of the plurality of extension portions.

Each of the plurality of extension portions may be configured so that a thickness along the uniaxial direction between a bottom surface of the groove portion and the first main surface is constant along the extending direction.

The first main surface may include recessed portions formed in the end portions.

The plurality of leg portions may include recessed portions formed along the uniaxial direction from connecting portions with the plurality of extension portions.

Each of the plurality of extension portions may have a pair of side surfaces that face each other in a direction perpendicular to the uniaxial direction and the corresponding extending direction.

The main body may further include connection portions that connect between adjacent extension portions of the plurality of extension portions.

The reel lock release member may be formed of a resin material, and the main body may further include side portions that connect between end portions of adjacent extension portions of the plurality of extension portions, a gate cut portion for resin injection being formed in each of the side portions.

The plurality of extension portions may be provided at equal intervals in a circumferential direction around the central portion. In this case, for example, the plurality of extension portions may include three extension portions provided at intervals of 120 degrees around the central portion.

MODE(S) FOR CARRYING OUT THE INVENTION

Hereinafter, an embodiment of the present technology will be described with reference to the drawings.

Figure 1:
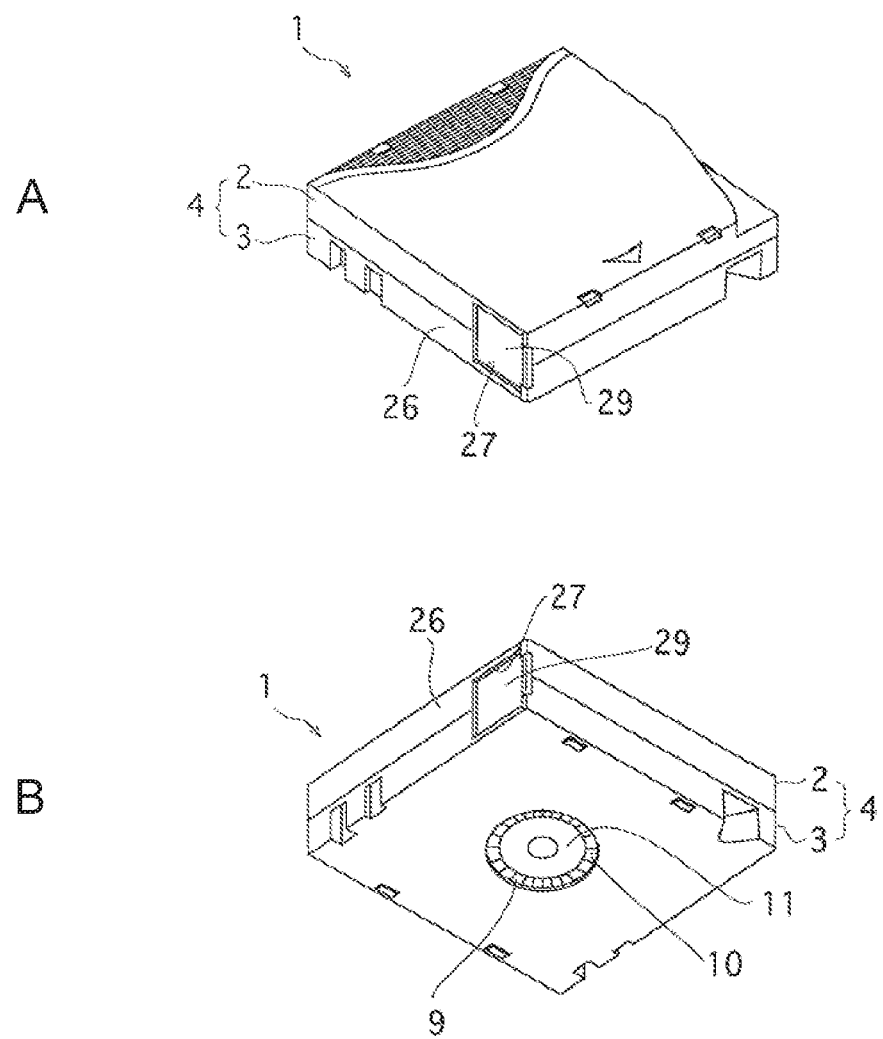
FIG. 1 is an overall perspective view of a tape cartridge according to an embodiment of the present technology, Part A being a perspective view as viewed from the side of the upper surface (upper shell), Part B being a perspective view as viewed from the side of the lower surface (lower shell).
Figure 2:
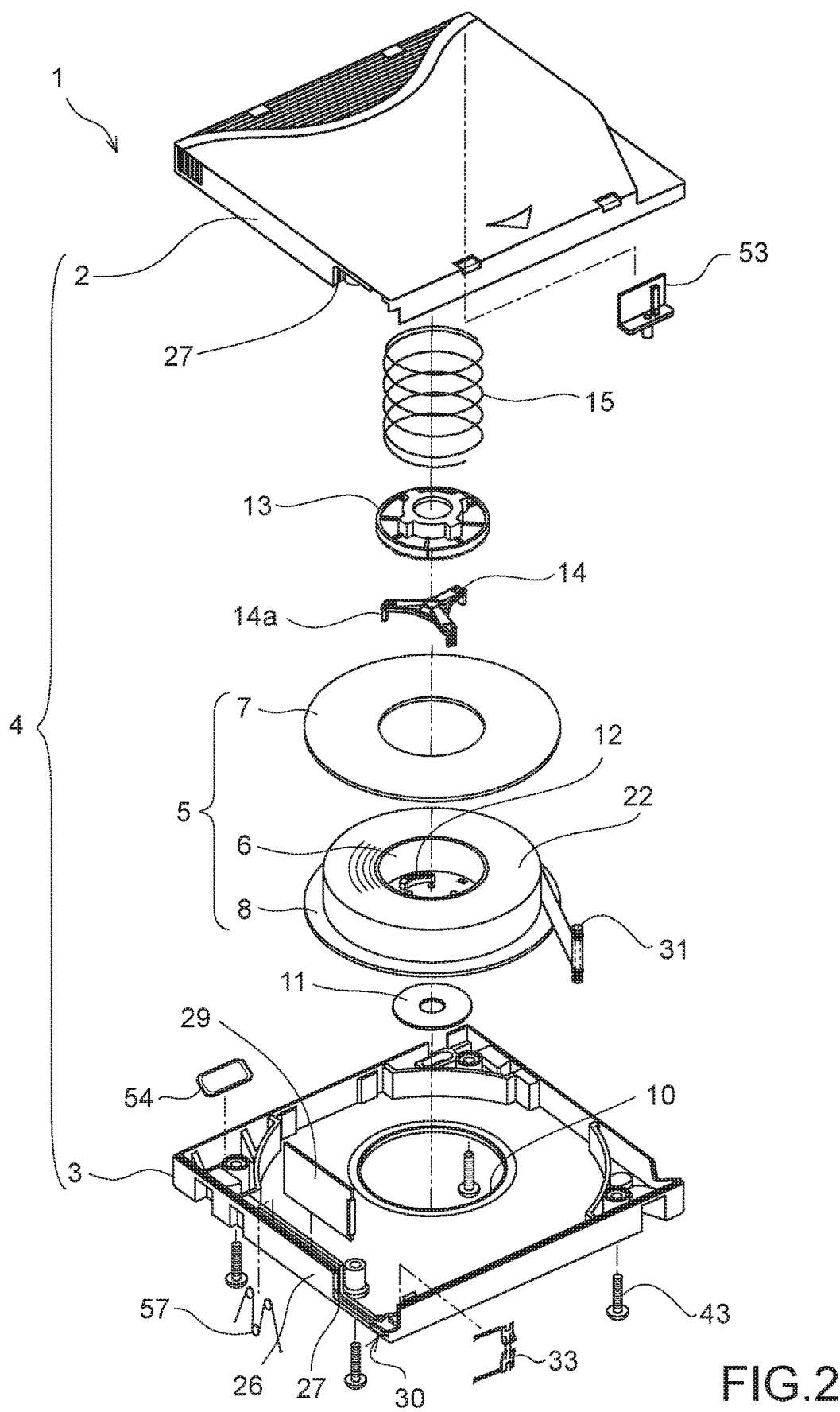
FIG. 2 is an exploded perspective view of the tape cartridge.
Figure 3:
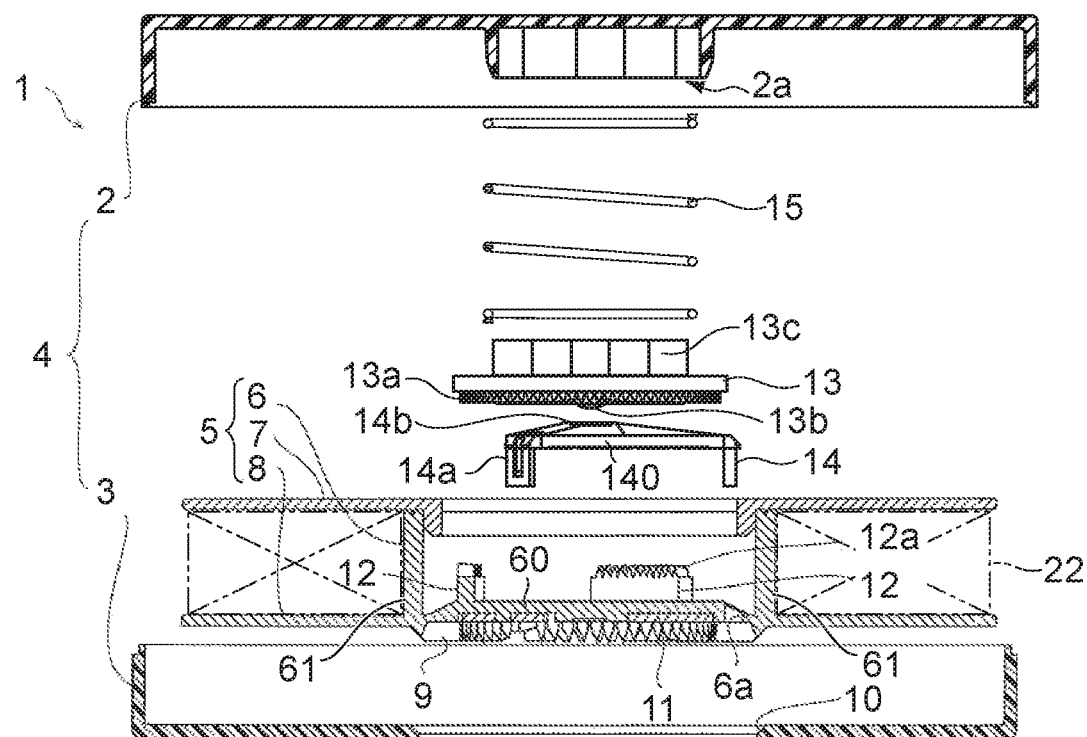
FIG. 3 is an exploded side cross-sectional view of the tape cartridge.

FIG. 1 is an overall perspective view of a tape cartridge 1 according to an embodiment of the present technology, Part A being a perspective view as viewed from the side of the upper surface (upper shell 2), Part B being a perspective view as viewed from the side of the lower surface (lower shell 3). FIG. 2 is an exploded perspective view of the tape cartridge 1, and FIG. 3 is an exploded side cross-sectional view thereof. In the following description, the up-down direction corresponds to a uniaxial direction in this embodiment.

[Overall Configuration]

The tape cartridge 1 according to this embodiment is configured as a magnetic tape cartridge conforming to the LTO standard. The tape cartridge 1 has a configuration in which a single tape reel 5 on which a magnetic tape 22 is wound is rotatably housed inside a cartridge case 4 formed by connecting the upper shell 2 and the lower shell 3 to each other with a plurality of screw members 43.

The tape reel 5 includes a reel hub 6 having a bottomed cylindrical shape, an upper flange 7 joined to an upper end (opening end) of the reel hub 6, and a lower flange 8 integrally formed at the lower end of the reel hub 6, which are each formed of an injection molded body of a synthetic resin material.

As shown in FIG. 3, the reel hub 6 has a cylindrical surface 61 and a cylindrical bottom portion (bottom portion) 60, the cylindrical surface 61 having an axis in the up-down direction, a tape being wound on the cylindrical surface 61. A plurality of through holes 6a penetrating in the up-down direction is formed in the bottom portion 60.

A chucking gear 9 that engages with a reel rotation drive shaft of a tape drive device is annularly formed in the center of the lower surface of the tape reel 5, and is exposed to the outside via an opening 10 provided in the center of the lower shell 3 as shown in Part B of FIG. 1. On the inner peripheral side of this chucking gear 9, an annular metal plate 11 that is magnetically attracted to the reel rotation drive shaft is fixed to the outer surface of the bottom portion 60 of the reel hub 6 by insert molding.

A reel spring 15, a reel lock member 13, and a reel lock release member 14 are disposed between the inner surface of the upper shell 2 and the tape reel 5, and they constitute a reel lock mechanism that prevents the tape reel 5 from rotating when the tape cartridge 1 is not used. Note that details of this reel lock mechanism will be described below.

An outlet 27 for pulling out one end of the magnetic tape 22 to the outside is provided to a side wall 26 of the cartridge case 4. A slide door 29 that opens and closes the outlet 27 is disposed on the inner side of the side wall 26. The slide door 29 is configured to slide in the direction of opening the outlet 27 against the urging force of a torsion spring 57 by engaging with a tape loading mechanism (illustration omitted) of the tape drive device.

A leader pin 31 is fixed to one end of the magnetic tape 22. The leader pin 31 is configured to be attachable/detachable to/from a pin holding portion 33 provided on the inner side of the outlet 27. The pin holding portion 33 is attached to the inner surface of the upper shell 2 and the inner surface of the lower shell 3, and is configured to be capable of elastically holding the upper end and the lower end of the leader pin 31.

Then, in addition to a safety tab 53 for preventing erroneous erasure of information recorded on the magnetic tape 22, a cartridge memory 54 capable of reading, in a contactless manner, and writing content relating to the information recorded on the magnetic tape 22 is disposed inside the cartridge case 4. The cartridge memory 54 includes a non-contact communication medium in which an antenna coil, an IC chip, and the like are mounted on a substrate.

[Reel Lock Mechanism]

As shown in FIG. 3, a reel lock mechanism for preventing the tape reel 5 from rotating when the tape cartridge 1 is not used is provided inside the reel hub 6.

The reel lock mechanism includes a plurality of gear forming walls 12 erected on the inner surface of the bottom portion 60 of the reel hub 6, the reel lock member 13 capable of engaging with the gear forming walls 12, the reel lock release member 14 for releasing the engagement between the gear forming walls 12 and the reel lock member 13, and the reel spring 15 provided between the inner surface of the upper shell 2 and the upper surface of the reel lock member 13.

The gear forming walls 12 each have an arc shape, and three gear forming walls 12 are formed at equal intervals on the inner surface of the bottom portion 60 of the reel hub 6 and on the same circumference around the axis of the reel hub 6. The gear forming walls 12 each include a gear portion 12a formed on the upper surface.

The reel spring 15 is a coli spring, and urges the reel lock member 13 downward to urge the tape reel 5 toward the side of the lower shell 3.

The reel lock member 13 is urged downward by the reel spring 15 to engage with the reel hub 6. Specifically, the reel lock member 13 includes a projecting portion 13b that projects downward toward the bottom portion 60 of the reel hub 6, engagement teeth 13a that engage with the gear portions 12a of the gear forming walls 12 in the up-down direction, and a fitting portion 13c formed on the upper surface. The projecting portion 13b has, for example, a cross-section having an arc shape and has a spherical surface. The fitting portion 13c fits with a protrusion 2a formed at the substantially central portion of the inner surface of the upper shell 2.

The engagement teeth 13a are annularly formed on the lower surface of the reel lock member 13, and are disposed to face the gear portions 12a of the gear forming walls 12. The engagement teeth 13a receive the reel spring 15 and are constantly urged in the direction of engaging with the gear portion 12a.

The reel lock release member 14 includes a main body 140 provided between the reel lock member 13 and the bottom portion 60 of the reel hub 6, and a plurality of leg portions 14a that extends downward from the main body 140. Each of the leg portions 14a is inserted into the corresponding through hole 6a penetrating the bottom portion 60 of the reel hub 6 in the up-down direction.

Figure 4:
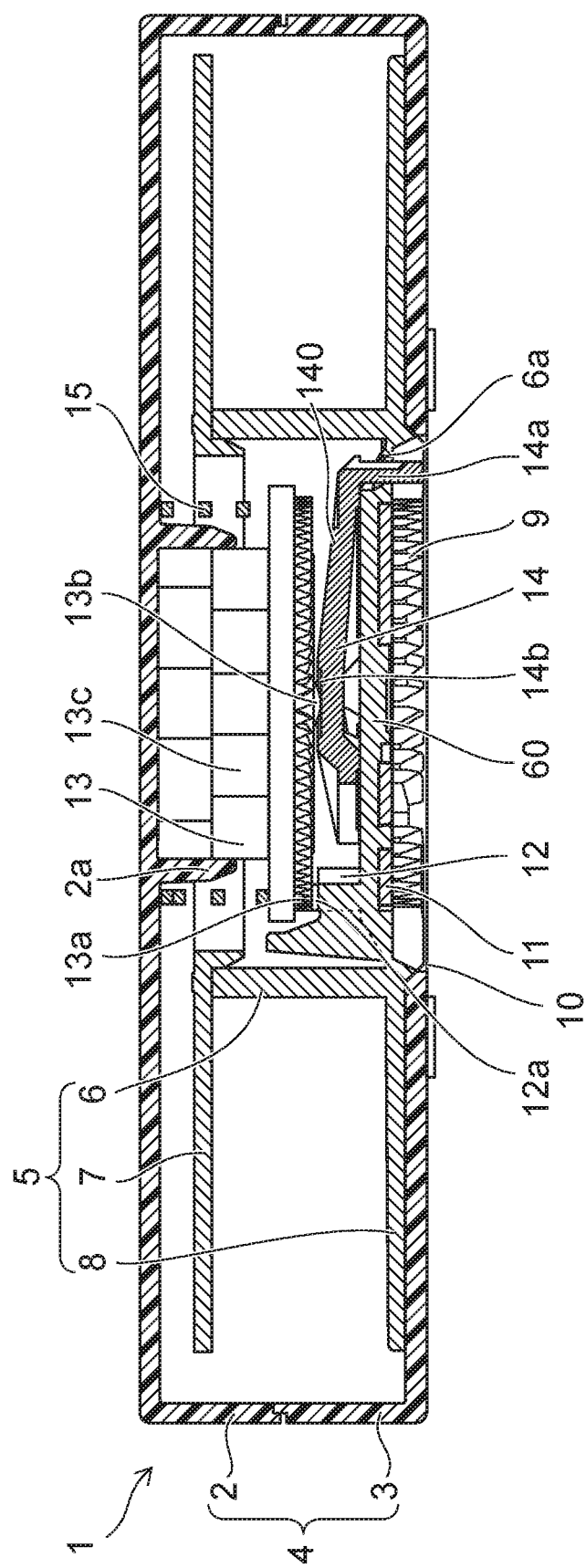
FIG. 4 is a cross-sectional view showing the state when the tape cartridge is not used.
Figure 5:
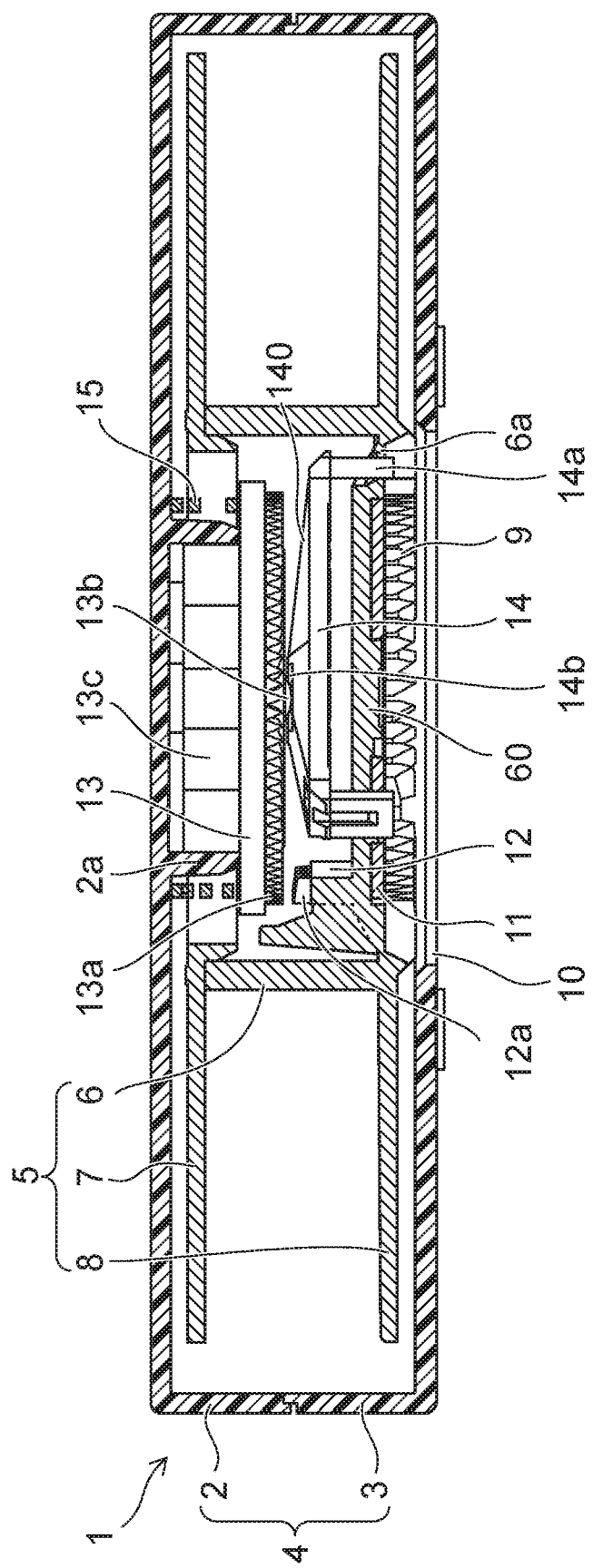
FIG. 5 is a cross-sectional view showing the state when the tape cartridge is used.

FIG. 4 is a cross-sectional view showing the state when the cartridge is not used. FIG. 5 is a cross-sectional view showing the state when the cartridge is used.

When the tape cartridge 1 shown in FIG. 4 is not used, the plurality of leg portions 14a is located between gears of the chucking gear 9 via the through holes 6a. A central portion 14b of the main body 140 receives the urging force from the reel spring 15 via the projecting portion 13b of the reel lock member 13. As a result, the main body 140 is disposed on the bottom portion 60 while receiving the urging force.

When the cartridge is not used, the reel lock member 13 engages with the gear portions 12a of the gear forming walls 12 via the engagement teeth 13a and presses the tape reel 5 toward the side of the lower shell 3. As a result, the reel lock member 13 prevents the tape reel 5 from rotating.

When the tape cartridge 1 shown in FIG. 5 is used, each of the leg portions 14a is pressed upward by the reel rotation drive shaft of the tape drive device, which engages with the chucking gear 9. As a result, the reel lock release member 14 releases, on the basis of movement of the reel spring 15 toward the upper side against the urging force, the engagement between the engagement teeth 13a of the reel lock member 13 and the gear portion 12a.

Then, the tape reel 5 is integrated with the reel rotation drive shaft by the magnetic attraction action between the metal plate 11 and the reel rotation drive shaft, and the tape reel 5 is rotationally driven via the chucking gear 9. At this time, the rotation operation of the reel lock member 13 is restricted by the fitting action of the fitting portion 13c and the protrusion 2a of the upper shell. Meanwhile, the reel lock release member 14 rotates with the tape reel 5 via the point contact state between the central portion 14b and the projecting portion 13b of the reel lock member 13.

[Reel Lock Release Member]

Figure 6:
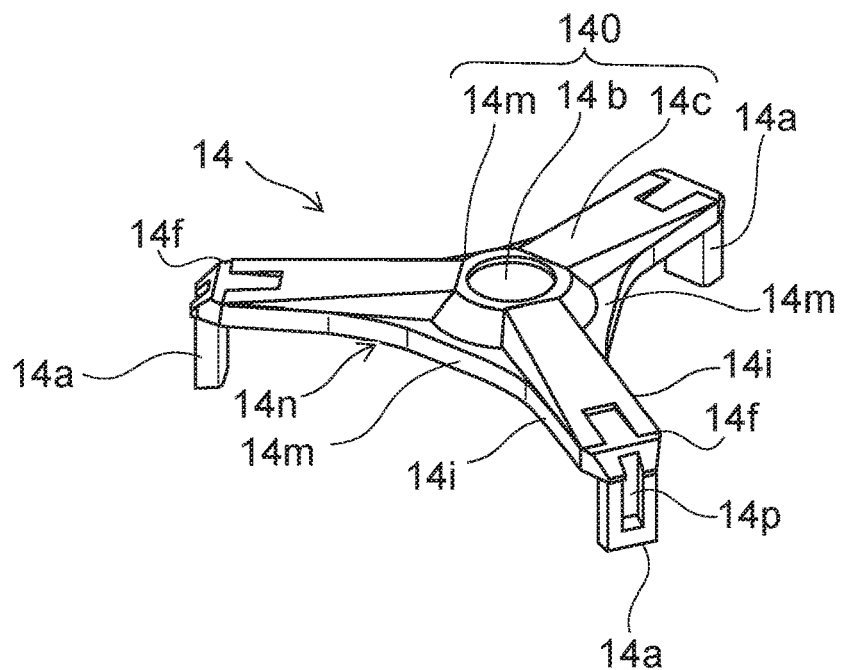
FIG. 6 is a perspective view of the reel lock release member.
Figure 7:
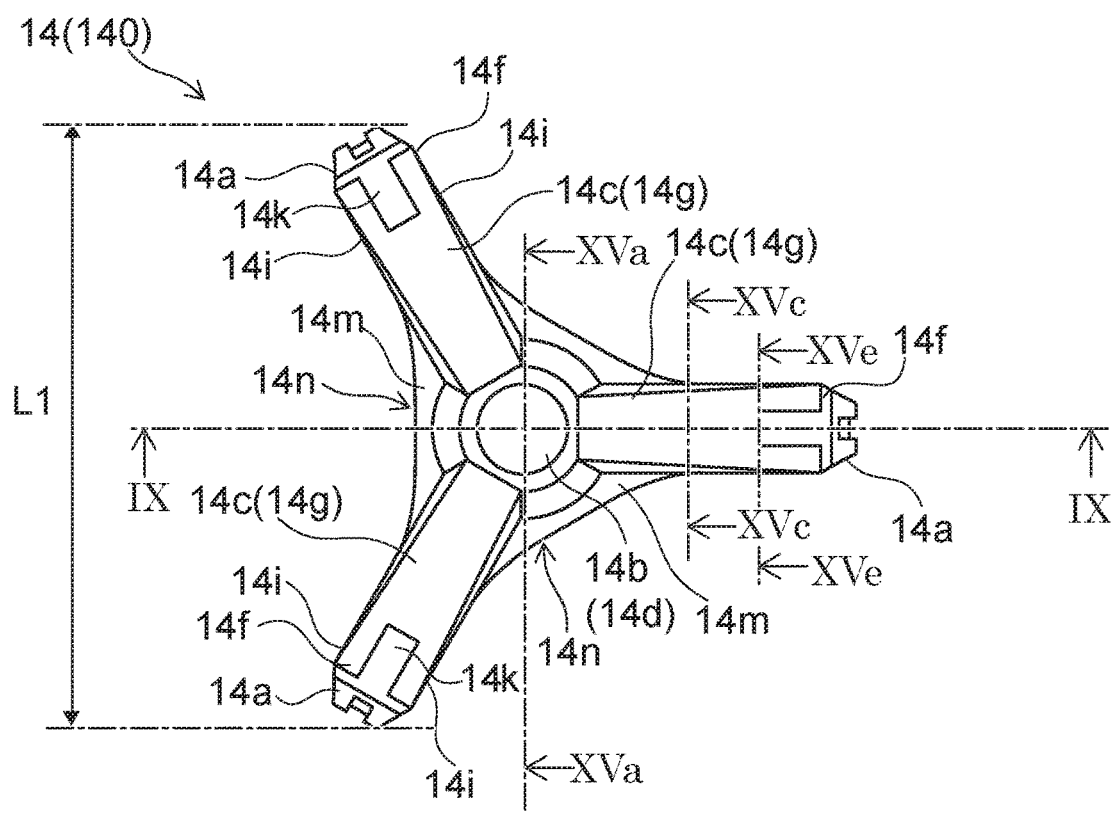
FIG. 7 is a plan view (top view) of the reel lock release member.
Figure 8:
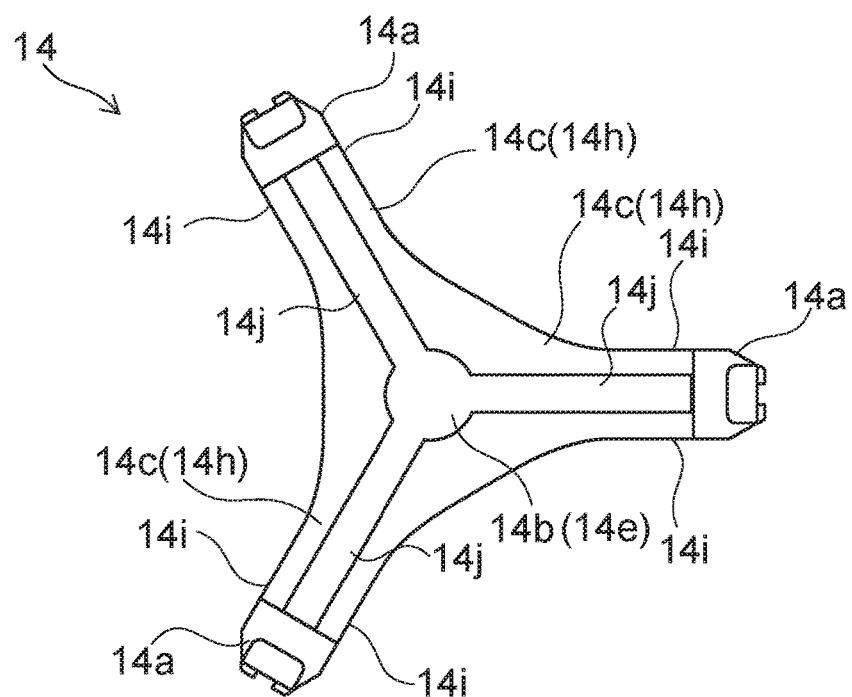
FIG. 8 is a back view (bottom view) of the reel lock release member.
Figure 9:
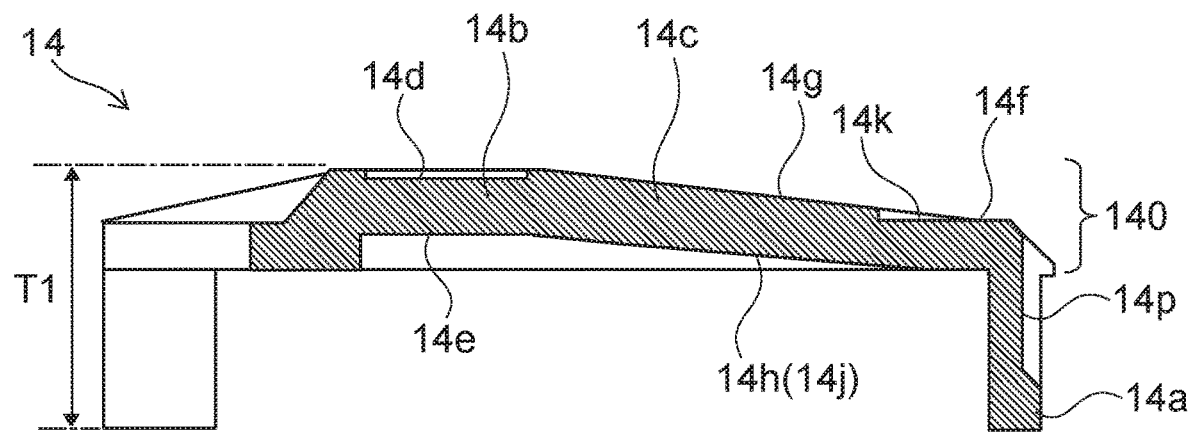
FIG. 9 is a cross-sectional view of the reel lock release member taken along the line IX-IX in FIG. 7.
Figure 10:
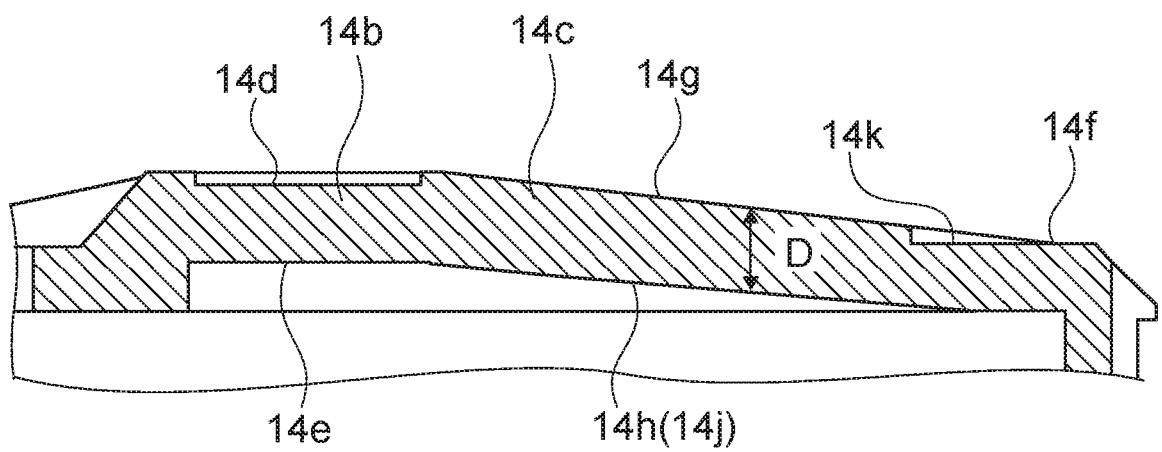
FIG. 10 is an enlarged view of a part of FIG. 9.

FIG. 6 is a perspective view of the reel lock release member 14. FIG. 7 is a plan view (top view) of the reel lock release member 14. FIG. 8 is a back view (bottom view) of the reel lock release member 14. FIG. 9 is a cross-sectional view of the reel lock release member 14 taken along the line IX-IX in FIG. 7. FIG. 10 is an enlarged view of a part of FIG. 9.

As shown in FIG. 6 to FIG. 8, the main body 140 of the reel lock release member 14 has a shape in which a plurality of extension portions 14c extend radially from the central portion 14b. The reel lock release member 14 is formed of, for example, an injection molded body of a synthetic resin containing an additive material in PC (polycarbonate) or PBT (polybutylene terephthalate).

By making the main body 140 of the reel lock release member 14 having the above-mentioned configuration, it is possible to reduce the weight and reduce the amount of resins to be used as compared with a reel lock release member having a substantially triangular shape shown in FIGS. 11 to 13 described below. As a result, it is possible to improve the production efficiency and reduce the production cost.

(Central Portion)

The main body 140 includes the central portion 14b that is in contact with the projecting portion 13b.

As shown in FIG. 6 and FIG. 9, the central portion 14b is formed in a shape projecting upward in the main body 140.

As shown in FIGS. 7 to 9, the central portion 14b has, for example, an upper recessed surface 14d and a lower recessed surface 14e. The lower recessed surface 14e is formed in a recessed shape deeper than the upper recessed surface 14d in the up-down direction.

The upper recessed surface 14d has, for example, a flat bottom surface having a circular shape, and is in sliding contact with the projecting portion 13b. The bottom surface of the upper recessed surface 14d is not limited to the flat surface, and may be a curved surface such as a spherical surface. By forming the upper recessed surface 14d in the central portion 14b, it is possible to make only the apex of the central portion 14b be in contact with the projecting portion 13b having a spherical surface, and ensure the sliding contact with the projecting portion 13b.

The lower recessed surface 14e has a flat bottom surface having a circular shape corresponding to the upper recessed surface 14d. Also the bottom surface of the lower recessed surface 14e is not limited to a flat surface, and may be a curved surface such as a spherical surface. The bottom surface of the lower recessed surface 14e is formed by, for example, a surface that is continuous with the bottom surface of a groove portion 14j of the extension portions 14c described below. By forming the lower recessed surface 14e, the entire central portion 14b can be deformed so as to slightly bend downward when it is urged downward by the reel lock member 13. As a result, it is possible to suppress the drag acting on the reel lock member 13 from the central portion 14b and smooth sliding can be achieved.

(Extension Portion)

The main body 140 includes the plurality of extension portions 14c that extends radially from the central portion 14b to end portions 14f connected to the plurality of leg portions 14a along the direction perpendicular to the up-down direction. The main body 140 includes three extension portions 14c in this embodiment. The extension portions 14c are provided at equal angular intervals in the circumferential direction around the central portion 14b, and three extension portions 14c are provided at intervals of 120 degrees in the circumferential direction in this embodiment.

As shown in FIG. 7 to FIG. 10, the extension portions 14c has a first main surface 14g that faces the reel lock member 13, a second main surface 14h disposed on the opposite side of the first main surface 14g, and a pair of side surfaces 14i. The first main surface 14g forms the upper surface of the extension portions 14c, and the second main surface 14h forms the lower surface of the extension portions 14c. The pair of side surfaces 14i connect the first main surface 14g and the second main surface 14h to each other.

As shown in FIG. 9 and FIG. 10, the first main surface 14g is formed in a substantially flat slope shape that is inclined from the central portion 14b toward the end portions 14f. That is, the thicknesses of the extension portions 14c along the up-down direction gradually decreases from the central portion 14b toward the end portions 14f. As a result, it is possible to secure the thickness of the central portion 14b to which the urging force is constantly applied from the reel lock member 13. Therefore, it is possible to ensure the rigidity against the bending moment around the central portion 14b.

As shown in FIG. 8 to FIG. 10, the second main surface 14h includes the groove portions 14j that extend along the extending direction of the extension portions 14c. The groove portions 14j are each formed in, for example, the central portion of the width direction of the extension portions 14c. In this embodiment, the groove portion 14j has a substantially flat bottom surface.

Since the second main surface 14h of the extension portions 14c includes the groove portions 14j, it is possible to further reduce the amount of resins to be used and perform production at lower cost. Further, it is possible to suppress the decrease in the second moment of area due to the decrease in the cross-sectional area in the cross section as viewed from the direction perpendicular to the extending direction of the extension portions 14c. As a result, it is possible to suppress the decrease in the rigidity of the extension portions 14c against the downward pressing force applied from the reel lock member 13.

As shown in FIG. 10, a thickness D between the first main surface 14g and the bottom surface of the groove portion 14j along the up-down direction may be constant along the extending direction of the extension portions 14c. As shown in Part C and Part E of FIG. 15 described below, the thickness D is a thickness along the up-down direction at a position where the first main surface 14g and the bottom surface of the groove portion 14j are closest to each other in the respective cross sections as viewed from the direction perpendicular to the extending direction of the extension portions 14c. Further, the expression "constant thickness" includes a substantially constant range, and, for example, the value variations within 1% with respect to the average value of the thicknesses of the respective cross sections of the extension portions 14c are allowed.

In the above-mentioned configuration, the cross-sectional area of the area surrounded by the first main surface 14g, the bottom surface of the groove portion 14j, and the side surfaces 14i in the cross section as viewed from the direction perpendicular to the extending direction of the extension portions 14c is substantially constant along the extending direction. As a result, after the reel lock release member 14 is injection-molded with a resin, the cross section of the above-mentioned area uniformly contracts along the extending direction when the resin contracts due to a temperature change. Therefore, it is possible to suppress the deformation such as the bending of the extension portions 14c due to uneven contract after the molding, and achieve favorable molding quality.

From the viewpoint of achieving further favorable molding quality, as shown in FIG. 9 and FIG. 10, the first main surface 14g may include recessed portions 14k formed in the end portions 14f. By the recessed portion 14k, the cross-sectional area near the end portions 14f is made more uniform, and it is possible to more reliably suppress deformation due to contract after the molding.

In this embodiment, the pair of side surfaces 14i face each other in the direction perpendicular to the up-down direction and the extending direction of the extension portions 14c. The pair of side surfaces 14i are formed as, for example, flat surfaces parallel to each other along the extending direction of the extension portions 14c. This makes it easier for an assembling device used when assembling the tape cartridge 1 to grasp the pair of side surfaces 14i of the reel lock release member 14 and insert the reel lock release member 14 into the reel hub 6.

(Connection Portion)

As shown in FIG. 6 and FIG. 7, the main body 140 further includes connection portions 14m that connect between adjacent extension portions 14c. The connection portions 14m are each formed so as to, for example, connect the adjacent extension portions 14c to each other from the base portions to the middle portions and to be connected to the side surfaces 14i of the extension portions 14c. By the connection portions 14m, it is possible to maintain the uniformity of the intervals between the adjacent extension portions 14c and prevent the extension portions 14c from deforming.

(Other Configurations of Main Body)

As shown in FIG. 6 and FIG. 7, the main body 140 may further include side portions 14n that connect between the end portions 14f of the adjacent extension portions 14c, a gate cut portion for resin injection being formed in each of the side portions 14n. In this embodiment, the side portions 14n are each a portion that includes the side surfaces 14i and the connection portions 14m of the extension portions 14c and faces the side of the main body 140. The gate cut portion is a mark obtained by cutting the gate that injects a resin into a mold for forming the reel lock release member 14 during injection molding.

That is, in this embodiment, a gate can be set at a place away from the central portion 14b. As a result, it is possible to prevent resin fragments that are likely to be generated in the vicinity of the gate from adhering to the central portion 14b. Therefore, it is possible to suppress a defect such as abnormal sound when the cartridge is used due to the resin fragments sandwiched between the central portion 14b and the projecting portion 13b of the reel lock member 13.

(Leg Portion)

As shown in FIG. 6 and FIG. 9, the plurality of leg portions 14a is connected to the end portion 14f of the corresponding extension portion 14c and extend downward. In this embodiment, each of the leg portions 14a includes a recessed portion 14p formed downward from the connecting portion with the corresponding extension portion 14c. The recessed portion 14p is formed, for example, in a groove shape extending from the connecting portion to the middle portion of the corresponding leg portion 14a. Alternatively, the recessed portion 14p may extend to the end of the leg portions 14a.

Here, the connecting portions between the leg portions 14a and the extension portions 14c are portions where the extension portions 14c that extend in different directions and the leg portions 14a are joined to each other, and the cross-sectional are locally increases. Therefore, the above-mentioned connecting portions contract more than other portions due to a temperature change after the injection molding, and a shape defect such as the leg portions 14a being inclined with respect to the extension portions 14c is likely to occur.

In this regard, in this embodiment, by forming the recessed portions 14p in the connecting portions with the extension portions 14c in the leg portions 14a, the cross-sectional area of the leg portions 14a is reduced. As a result, it is possible to reduce the amount of contract of resins in the connecting portions of the leg portions 14a and prevent a shape defect due to resin contract from occurring.

The cross-sectional shape of the recessed portion 14p is, for example, a groove shape including a flat bottom surface. However, the present technology is not limited thereto, and the cross-sectional shape of the recessed portion 14p may include, for example, a bottom surface formed of a curved surface or may be a V shape. Also the depth of the recessed portion 14p is not limited, and can be appropriately set in consideration of the effect of preventing a shape defect from occurring and the strength of the leg portions 14a.

Note that in this embodiment, also by providing the above-mentioned recessed portions 14k in the end portions 14f of the extension portions 14c, it is possible to reduce the amount of contract of resins in the connecting portions between the leg portions 14a and the extension portions 14c, and more reliably prevent a shape defect in the above-mentioned connecting portions from occurring.

[Operation and Effect]

Hereinafter, the operation and effect of this embodiment will be described in more detail by using a reel lock release member 24 according to Comparative Example as an example.

Figure 11:
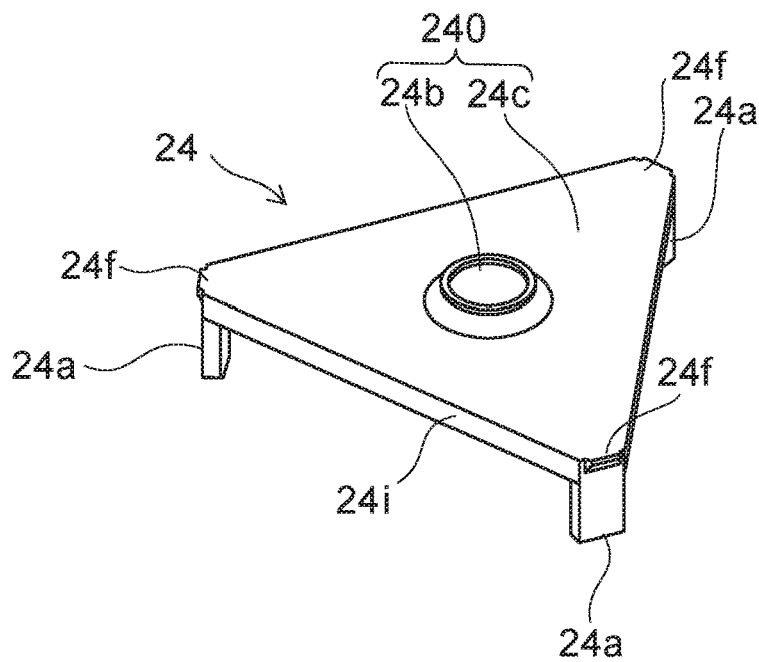
FIG. 11 is a perspective view of a reel lock release member according to Comparative Example of the above-mentioned embodiment.
Figure 12:
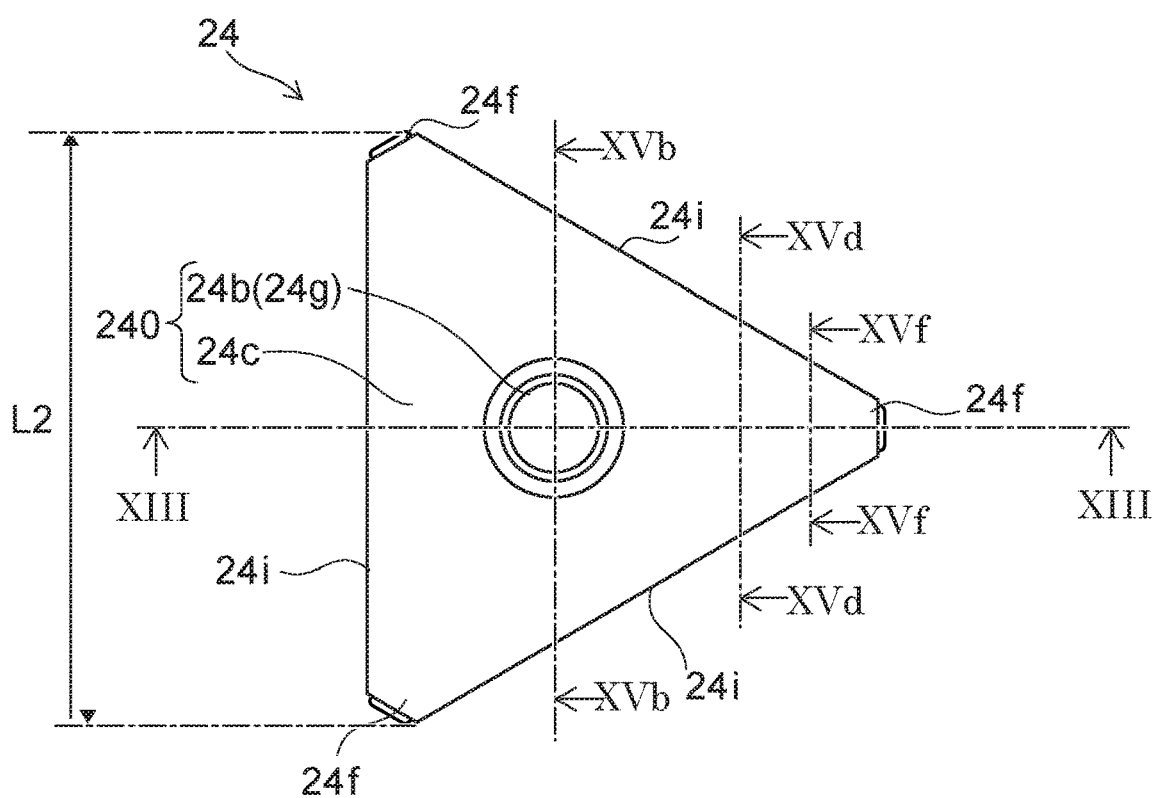
FIG. 12 is a back view (bottom view) of the reel lock release member.
Figure 13:
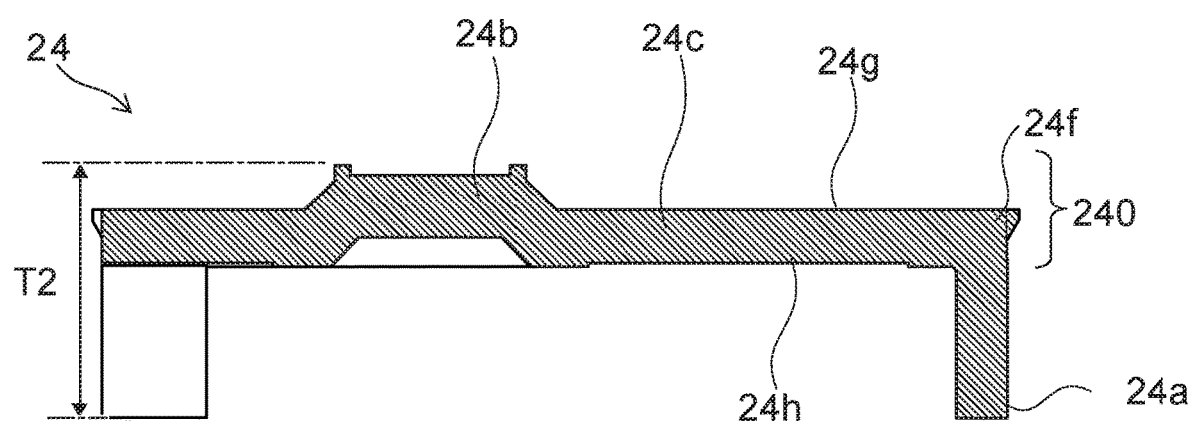
FIG. 13 is a cross-sectional view of the reel lock release member taken along the line XIII-XIII in FIG. 12.

FIGS. 11 to 13 are each a diagram showing the reel lock release member 24 according to Comparative Example of this embodiment. FIG. 11 is a perspective view, FIG. 12 is a plan view, and FIG. 13 is a cross-sectional view taken along the line XIII-XIII in FIG. 12.

As shown in FIGS. 11 to 13, the reel lock release member 24 includes a main body 240 having a substantially triangular shape and three leg portions 24a that extend downward from the vicinity of apex portions 24f of the main body 240. The main body 240 includes a central portion 24b having a configuration similar to that in this embodiment, and a peripheral edge portion 24c formed around the central portion 24b. The peripheral edge portion 24c is formed in a substantially equilateral triangular plate shape including the apex portions 24f, and has, for example, a substantially flat first main surface 24g and a substantially flat second main surface 24h that face each other in the up-down direction.

In this configuration, since the peripheral edge portion 24c has a substantially equilateral triangular shape, the volume of the main body 240 is likely to be large and the amount of resins to be used is likely to be large as compared with the main body 140 in this embodiment. For this reason, it is difficult to reduce the production cost.

On the other hand, in this embodiment, the central portion 14b and the leg portions 14a are connected to each other by the rod-shaped extension portions 14c, and thus, it is possible to significantly (e.g., 30 to 40%) reduce the weight of the reel lock release member 14 as compared with the reel lock release member 24. As a result, it is possible to significantly reduce the amount of resins to be used, improve the production efficiency of the reel lock release member 14, and reduce the production cost.

Further, since side surfaces 24i of the peripheral edge portion 24c are opened at an angle of approximately 60° with each other, it is difficult for the assembling device to grasp the side surfaces 24i. For this reason, the posture of the reel lock release member 14 is likely to be unstable when the reel lock release member 14 is inserted into the reel hub 6, and the efficiency of the assembling work is reduced.

On the other hand, in this embodiment, since each of the extension portions 14c has the side surfaces 14i substantially parallel to each other, the assembling device is capable of easily grasping the side surfaces 14i. As a result, it is possible to insert the reel lock release member 14 grasped by a grasping portion of the assembling device into the reel hub 6 in a stable posture. Therefore, it is possible to improve the efficiency of the assembling work.

Further, each of the leg portions 24a of the reel lock release member 24 does not include a recessed portion in the vicinity of the connecting portion with the main body 240. For this reason, the cross-sectional area locally increases in the vicinity of the above-mentioned connecting portion, and the amount of contract of resins due to a temperature change after the injection molding increases. For this reason, the vicinity of the above-mentioned connecting portion unevenly contracts, which makes it difficult to maintain the perpendicularity of the leg portions 24a with respect to the main body 240.

On the other hand, in this embodiment, since the leg portions 14a include the recessed portion 14p in the connecting portions with the extension portions 14c, it is possible to reduce the cross-sectional area of the connecting portion and reduce the amount of contract of resins due to a temperature change after the injection molding. Therefore, it is possible to ensure the perpendicularity of the leg portions 14a with respect to the main body 140.

Here, in the reel lock release member 14, the central portion 14b constantly receives the urging force downward by the reel lock member 13. In the reel lock release member 14 in this embodiment, sufficient strength against the urging force can be ensured while the volume and weight are significantly reduced as compared with the reel lock release member 24.

If the strength against the above-mentioned urging force cannot be sufficiently ensured, the vicinity of the central portion deforms so as to largely bend downward by the urging force. As a result, also the reel lock member that receives drag upward by the central portion deforms downward, and the clearance between the engagement portion and the gear portion on the side of the reel hub becomes narrow. As a result, they are in contact with each other during use, and a defect such as abnormal sound occurs.

In this embodiment, as shown below, the extension portions 14c has sufficient rigidity with respect to the bending moment in the up-down direction. As a result, it is possible to the central portion 14b from deforming downward due to the urging force from the reel spring 15. Therefore, it is possible to prevent a defect such as an abnormal sound during use from occurring.

Actually, five reel lock release members 14 according to Example and five reel lock release members 24 according to Comparative Example were prepared, and the deformation amount in the case where a downward load was applied to the central portion was examined.

Figure 14:
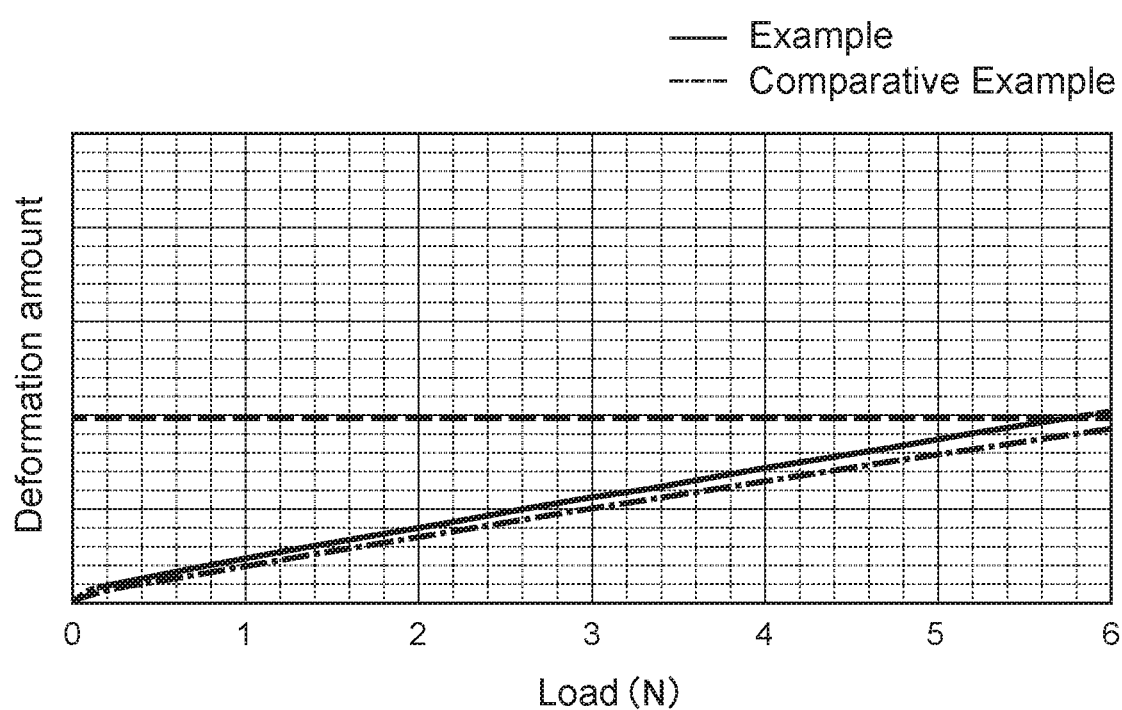
FIG. 14 is a graph showing the deformation amount of central portions of the reel lock release members according to Example and Comparative Example in the case where a load is applied to the respective central portions, the horizontal axis indicating the load, the vertical axis indicating the deformation amount.

FIG. 14 is a graph showing the deformation amount of the central portion in the case where a load has been applied to the central portion of each of the reel lock release members according to Example and Comparative Example. In FIG. 14, the horizontal axis indicate the load, and the vertical axis indicates the deformation amount. This graph shows the average values of the five samples in Example and the five samples in Comparative Example. The thick broken line in the graph indicates the upper limit value of the allowable deformation amount that is capable of preventing the engagement portion of the reel lock member and the gear portion on the side of the reel hub from being in contact with each other.

The design values of dimensions L1 and L2 (see FIG. 7 and FIG. 12) of the largest portions of the reel lock release member according to Example and Comparative Example in the plane perpendicular to the up-down direction were the same. Also the design values of thicknesses T1 and T2 (see FIG. 9 and FIG. 13) of the reel lock release member according to Example and Comparative Example including the leg portions in the up-down direction were the same. The weight of the reel lock release member according to Example was approximately 0.6 times as the weight of the reel lock release member according to Comparative Example.

As shown in FIG. 14, the deformation amount of the reel lock release member according to Example was approximately 1.1 times the deformation amount of the reel lock release member according to Comparative Example at any load application, and had comparable values.

A maximum load of approximately 5 N is applied during use, a larger load being applied during use than when not used. The deformation amount of the reel lock release member according to Example did not exceed the upper limit value of the allowable deformation amount even when a load of 5 N was applied.

From this result, it has been confirmed that the reel lock release member 14 in this embodiment is capable of sufficiently suppressing the deformation due to the urging force from the reel spring 15 while significantly reducing the amount of resins to be used. Further, it is presumed that the reel lock release member 14 in this embodiment is capable of preventing the engagement teeth 13a of the reel lock member 13 and the gear portion 12a on the side of the reel hub 6 from being in contact with each other due to deformation of the central portion 14b even when the tape cartridge 1 is actually used. It is conceivable that these actions are caused by that fact that the thickness of the central portion 14b in the up-down direction is sufficiently thick and the groove portion 14j is formed in the second main surface 14h, for example.

The rigidity of the extension portions 14c with respect to the bending moment in the up-down direction can be evaluated using the second moment of area of the cross section as viewed from the extending direction of the extension portions 14c. In this regard, the cross sections of the samples according to Example and Comparative Example used in the above-mentioned load application test were compared with each other, and the cross-sectional area thereof and the second moment of area were compared with each other.

Figure 15:
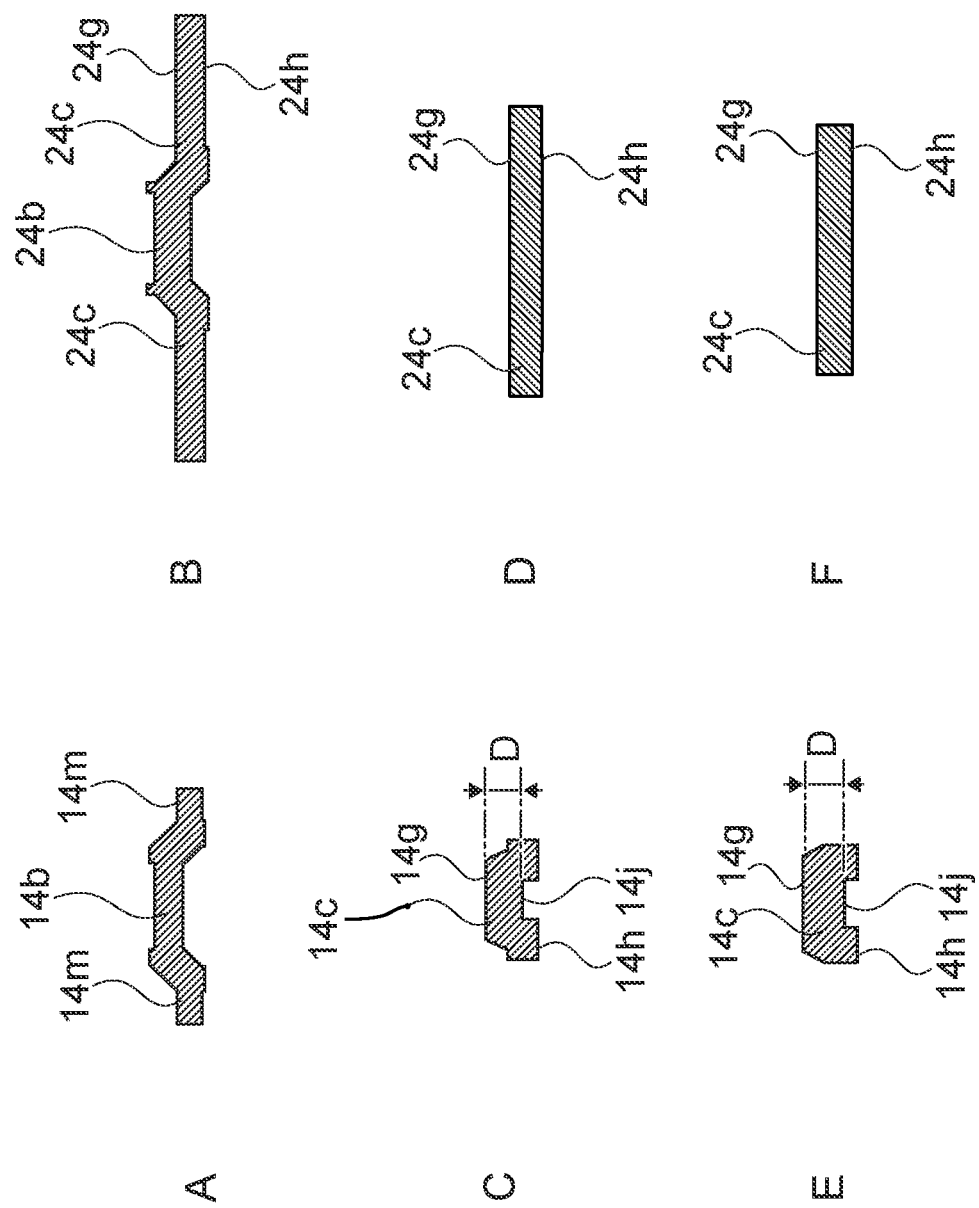
FIG. 15 is a diagram comparing cross-sectional shapes of the main bodies of the reel lock release member according to Example of the above-mentioned embodiment and the reel lock release member according to Comparative Example, Part A being a cross-sectional view taken along the line XVa-XVa in FIG. 7, Part B being a cross-sectional view taken along the line XVb-XVb in FIG. 12, Part C being a cross-sectional view taken along the line XVc-XVc in FIG. 7, Part D being a cross-sectional view taken along the line XVd-XVd in FIG. 12, Part E being a cross-sectional view taken along the line XVe-XVe in FIG. 7, Part F being a cross-sectional view taken along the line XVf-XVf in FIG. 12.

FIG. 15 is a diagram comparing the cross-sectional shapes of the main bodies of the reel lock release member 14 in this embodiment and the reel lock release member 24 according to Comparative Example.

Part A of FIG. 15 a cross-sectional view taken along the line XVa-XVa of FIG. 7 and a cross-sectional view of a portion passing through the central portion 14b of the reel lock release member 14 according to Example. Part B of FIG. 15 is a cross-sectional view taken along the line XVb-XVb in FIG. 12 and a cross-sectional view of a portion passing through the central portion 24b of the reel lock release member 24 according to Comparative Example. Note that the compared samples according to Example and Comparative Example were configured such that the thicknesses in the vicinity of the central portions 14b and 24b in the up-down direction were substantially the same.

In the cross section shown in Part A of FIG. 15, the connection portions 14m slightly project laterally from the central portion 14b formed in a projecting shape. Meanwhile, in the cross section shown in Part B of FIG. 15, the peripheral edge portion 24c greatly extends laterally from the central portion 24b.

The cross-sectional area of the reel lock release member 14 shown in Part A of FIG. 15 was 58% when the cross-sectional area of the reel lock release member 24 shown in Part B of FIG. 15 was 100%. Meanwhile, the second moment of area of the above-mentioned cross section of the reel lock release member 14 was 80% when the second moment of area of the above-mentioned cross section of the reel lock release member 24 was 100%.

Part C of FIG. 15 is a cross-sectional view taken along the line XVc-XVc in FIG. 7 and a cross-sectional view of the middle portion of the extension portion 14c. Part D of FIG. 15 is a cross-sectional view taken along the line XVd-XVd in FIG. 12 and a cross-sectional view of a portion corresponding to Part C of FIG. 15 between the central portion 24b and the leg portion 24a. In the cross section shown in Part C of FIG. 15, the groove portion 14j is formed in the second main surface 14h. In the cross section shown in Part D of FIG. 15, no groove portion is formed and the whole is formed in a flat plate shape.

The cross-sectional area of the reel lock release member 14 shown in Part C of FIG. 15 was 47% when the cross-sectional area of the reel lock release member 24 shown in Part D of FIG. 15 was 100%. Meanwhile, the second moment of area of the above-mentioned cross section of the reel lock release member 14 was 96% when the second moment of area of the above-mentioned cross section of the reel lock release member 24 was 100%.

Part E of FIG. 15 is a cross-sectional view taken along the line XVe-XVe in FIG. 7 and a cross-sectional view of the extension portion 14c at a position closer to the end portion 14f than in Part C of FIG. 15. Part F of FIG. 15 is a cross-sectional view taken along the line XVf-XVf in FIG. 12 and a cross-sectional view of a portion closer to the apex portion 24f between the central portion 24b and the leg portion 24a, which corresponds to Part E of FIG. 15. In the cross section shown in Part E of FIG. 15, the shallow groove portion 14j is formed in the second main surface 14h. In the cross section shown in Part F of FIG. 15, the whole is formed in a flat plate shape similarly to the cross section shown in Part D of FIG. 15.

The cross-sectional area of the above-mentioned cross section of the reel lock release member 14 shown in Part E of FIG. 15 was 47% when the cross-sectional area of the reel lock release member 24 shown in Part F of FIG. 15 was 100%. Meanwhile, the second moment of area of the cross section of the reel lock release member 14 shown in Part F of FIG. 15 was 80% when the second moment of area of the above-mentioned cross section of the reel lock release member 24 was 100%.

From the above results, the cross-sectional area of the respective portions of the reel lock release member 14 was significantly reduced to approximately 50% with respect to the cross-sectional area of the corresponding portions of the reel lock release member 24. As a result, it has been confirmed that it is possible to significantly reduce the amount of resins to be used, improve the productivity, and reduce the production cost.

Meanwhile, the second moment of area of the respective portions of the reel lock release member 14 was 80% or more with respect to the second moment of area of the corresponding portions of the reel lock release member 24, and the significant decrease in the second moment of area due to the decrease in the cross-sectional area can be suppressed. As a result, it has been confirmed that the reel lock release member 14 in this embodiment includes the extension portions 14c including the groove portion 14j, and thus has a configuration with high rigidity against the bending moment in the up-down direction while reducing the volume and weight.

Further, in this embodiment, as shown in Part C of FIG. 15 and Part E of FIG. 15, the thickness D along the up-down direction between the first main surface 14g of the extension portion 14c and the bottom surface of the groove portion 14j is constant along the extending direction. That is, it is possible to make the cross-sectional area between the first main surface 14g and the bottom surface of the groove portion 14j substantially constant along the extending direction. As a result, it is possible to make the amount of contraction of resins due to a temperature change after the injection molding in the extension portions 14c constant along the extending direction. Therefore, it is possible to suppress the deformation such as the bending of the extension portions 14c after the molding and improve the molding quality.

Other Embodiments

Although an embodiment of the present technology has been described above, it goes without saying that the present technology is not limited to only the above-mentioned embodiment and various modifications can be made without departing from the essence of the present technology.

Figure 16:
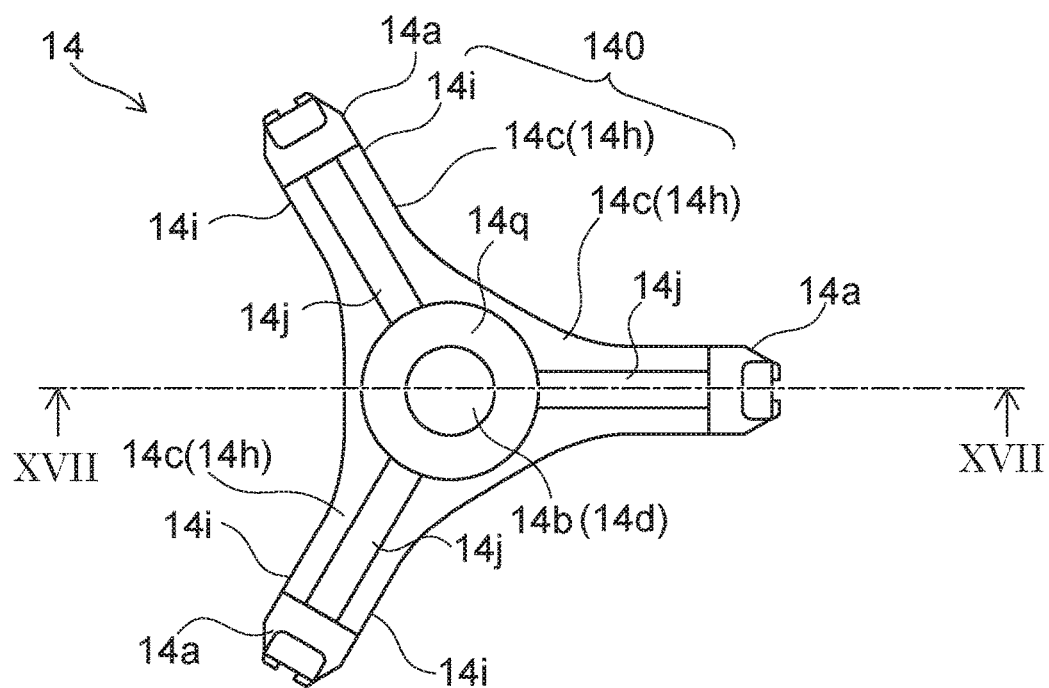
FIG. 16 is a back view (bottom view) of a reel lock release member according to another embodiment of the present technology.
Figure 17:
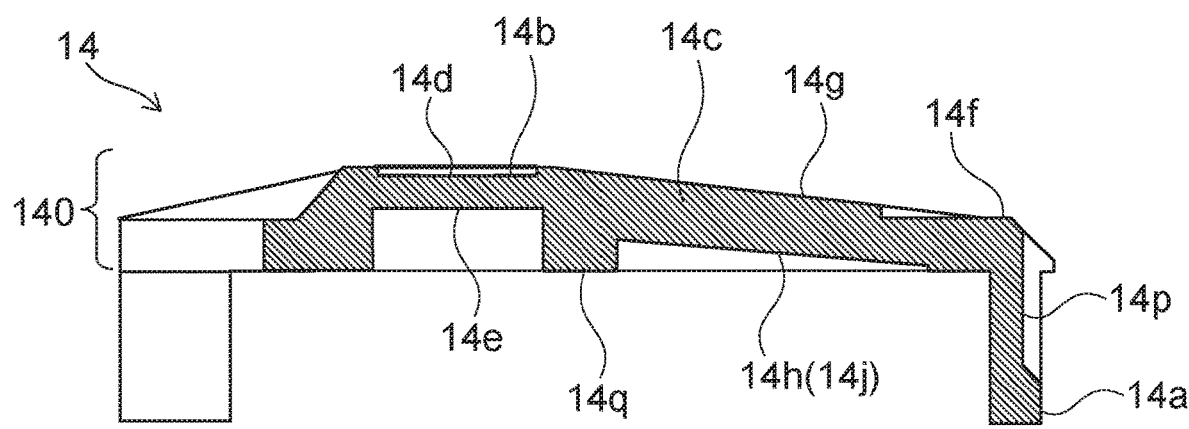
FIG. 17 is a cross-sectional view of the reel lock release member taken along the line XVII-XVII in FIG. 16.

FIG. 16 and FIG. 17 are each a diagram showing the reel lock release member 14 according to another embodiment of the present technology. FIG. 16 is a back view (bottom view) and FIG. 17 is a cross-sectional view taken along the line XVII-XVII in FIG. 16. In these figures and the following description, similar configurations will be denoted by the same reference symbols and description thereof will be omitted.

As shown in these figures, the extension portion 14c of the reel lock release member 14 may further include a base portion 14q that is connected to the central portion 14b and projects downward. The base portion 14q is formed in, for example, a ring shape surrounding the periphery of the central portion 14b. The base portion 14q reinforces the connecting portion between the extension portion 14c and the central portion 14b. Therefore, it is possible to achieve a configuration that has higher strength against the load applied to the central portion 14b and is less likely to be deformed.

As another embodiment, the extension portion does not necessarily need to include a groove portion. Further, the shape of the groove portion is not limited to the shape in the above-mentioned embodiment, and the bottom surface may be a curved surface or a V shape.

The extension portion does not necessarily need to have side surfaces parallel to each other, and may have, for example, a width that increase toward the end thereof.

The main body does not necessarily need to include a connection portion. Further, the configuration of the connection portion is not limited to the above configuration as long as adjacent extension portions can be connected to each other. For example, the connection portion may have a rod shape that connects the middle portions between adjacent extension portions 14c to each other. Alternatively, the connection portion may have a configuration that connects the base portions of the extension portions 14c, which are annularly formed around the central portion, to each other.

The leg portion does not necessarily need to include a recessed portion.

Although a magnetic tape cartridge incorporating a tape reel on which a magnetic tape has been wound has been described in the above-mentioned embodiments, the present technology is applicable similarly to a cleaning tape cartridge incorporating a tape reel on which a cleaning tape is wound.

Although a tape cartridge conforming to the LTO standard has been described in the above-mentioned embodiments, the present technology is not limited thereto and is applicable similarly to a reel lock release mechanism in a tape cartridge conforming to another standard.

It should be noted that the present technology may take the following configurations.

(1) A tape cartridge, including:

a reel that includes a reel hub including a cylindrical surface and a cylindrical bottom portion, the cylindrical surface having an axis in a uniaxial direction, a tape being wound on the cylindrical surface, a plurality of through holes penetrating in the uniaxial direction being formed in the cylindrical bottom portion;

a cartridge case that rotatably houses the reel;

a reel lock member that includes a projecting portion projecting toward the cylindrical bottom portion in the uniaxial direction and is urged in the uniaxial direction to engage with the reel hub; and a reel lock release member that includes a main body and a plurality of leg portions, the main body being disposed between the reel lock member and the cylindrical bottom portion, the plurality of leg portions extending from the main body in the uniaxial direction and being inserted into the plurality of through holes, the reel lock release member releasing engagement of the reel lock member and the reel hub on a basis of movement in the uniaxial direction against an urging force of the reel lock member, the main body including a central portion and a plurality of extension portions, the central portion being in contact with the projecting portion, the plurality of extension portions extending radially along a direction perpendicular to the uniaxial direction from the central portion to end portions connected to the plurality of leg portions, thicknesses of the plurality of extension portions along the uniaxial direction gradually decreasing from the central portion toward the end portions.

(2) The tape cartridge according to (1) above, in which
each of the plurality of extension portions has a first main surface that faces the reel lock member, and a second main surface disposed on an opposite side of the first main surface, and
the second main surface includes groove portions extending in respective extending directions of the plurality of extension portions.

(3) The tape cartridge according to (2) above, in which
each of the plurality of extension portions is configured so that a thickness along the uniaxial direction between a bottom surface of the groove portion and the first main surface is constant along the extending direction.

(4) The tape cartridge according to (2) or (3) above, in which
the first main surface includes recessed portions formed in the end portions.

(5) The tape cartridge according to any one of (1) to (4) above, in which
the plurality of leg portions includes recessed portions formed along the uniaxial direction from connecting portions with the plurality of extension portions.

(6) The tape cartridge according to any one of (1) to (5) above, in which
each of the plurality of extension portions has a pair of side surfaces that face each other in a direction perpendicular to the uniaxial direction and the corresponding extending direction.

(7) The tape cartridge according to any one of (1) to (6) above, in which
the main body further includes connection portions that connect between adjacent extension portions of the plurality of extension portions.

(8) The tape cartridge according to any one of (1) to (7) above, in which
the reel lock release member is formed of a resin material, and
the main body further includes side portions that connect between end portions of adjacent extension portions of the plurality of extension portions, a gate cut portion for resin injection being formed in each of the side portions.

(9) The tape cartridge according to any one of (1) to (8) above, in which
the plurality of extension portions is provided at equal intervals in a circumferential direction around the central portion.

(10) The tape cartridge according to (9) above, in which
the plurality of extension portion includes three extension portions at an interval of 120 degrees around the central portion.

REFERENCE SIGNS LIST 1 tape cartridge
2 upper shell
3 lower shell
4 cartridge case
5 tape reel
6 reel hub
12 gear forming wall
13 reel lock member
14 reel lock release member
22 magnetic tape
60 bottom portion of reel hub
140 main body of reel lock release member
14$a$ leg portion
14$b$ central portion
14$c$ extension portion
14$g$ first main surface of extension portion
14$h$ second main surface of extension portion
14$j$ groove portion of extension portion
14$p$ recessed portion of leg portion
14$i$ side surface of extension portion
14$m$ connection portion
14$n$ side portion of main body

The invention claimed is:

1. A tape cartridge, comprising:
a reel that includes a reel hub including a cylindrical surface and a cylindrical bottom portion, the cylindrical surface having an axis in a uniaxial direction, a tape being wound on the cylindrical surface, a plurality of through holes penetrating in the uniaxial direction being formed in the cylindrical bottom portion;
a cartridge case that rotatably houses the reel;
a reel lock member that includes a projecting portion projecting toward the cylindrical bottom portion in the uniaxial direction and is urged in the uniaxial direction to engage with the reel hub; and
a reel lock release member that includes a main body and a plurality of leg portions, the main body being disposed between the reel lock member and the cylindrical bottom portion, the plurality of leg portions extending from the main body in the uniaxial direction and being inserted into the plurality of through holes, the reel lock release member releasing engagement of the reel lock member and the reel hub on a basis of movement in the uniaxial direction against an urging force of the reel lock member, the main body including a central portion and a plurality of extension portions, the central portion being in contact with the projecting portion, the plurality of extension portions extending radially along a direction perpendicular to the uniaxial direction from the central portion to end portions connected to the plurality of leg portions, thicknesses of the plurality of extension portions along the uniaxial direction gradually decreasing from the central portion toward the end portions.

2. The tape cartridge according to claim 1, wherein
each of the plurality of extension portions has a first main surface that faces the reel lock member, and a second main surface disposed on an opposite side of the first main surface, and the second main surface includes groove portions extending in respective extending directions of the plurality of extension portions.

3. The tape cartridge according to claim 2, wherein each of the plurality of extension portions is configured so that a thickness along the uniaxial direction between a bottom surface of the groove portion and the first main surface is constant along the extending direction.

4. The tape cartridge according to claim 2, wherein the first main surface includes recessed portions formed in the end portions.

5. The tape cartridge according to claim 1, wherein the plurality of leg portions includes recessed portions formed along the uniaxial direction from connecting portions with the plurality of extension portions.

6. The tape cartridge according to claim 1, wherein each of the plurality of extension portions has a pair of side surfaces that face each other in a direction perpendicular to the uniaxial direction and a corresponding extending direction.

7. The tape cartridge according to claim 1, wherein the main body further includes connection portions that connect between adjacent extension portions of the plurality of extension portions.

8. The tape cartridge according to claim 1, wherein the reel lock release member is formed of a resin material, and
the main body further includes side portions that connect between end portions of adjacent extension portions of the plurality of extension portions.

9. The tape cartridge according to claim 1, wherein the plurality of extension portions is provided at equal intervals in a circumferential direction around the central portion.

10. The tape cartridge according to claim 9, wherein the plurality of extension portions includes three extension portions at an interval of 120 degrees around the central portion.

* * * * *